United States Patent
Fujimura

(10) Patent No.: US 7,922,952 B2
(45) Date of Patent: Apr. 12, 2011

(54) SIMULTANEOUS INJECTION-MOLDING AND DECORATING METHOD

(75) Inventor: Toshitsugu Fujimura, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 12/681,199

(22) PCT Filed: Oct. 3, 2008

(86) PCT No.: PCT/JP2008/068074
§ 371 (c)(1),
(2), (4) Date: Apr. 1, 2010

(87) PCT Pub. No.: WO2009/044869
PCT Pub. Date: Apr. 9, 2009

(65) Prior Publication Data
US 2010/0219553 A1    Sep. 2, 2010

(30) Foreign Application Priority Data
Oct. 4, 2007  (JP) .................... 2007-261317

(51) Int. Cl.
*B29C 45/14*   (2006.01)
(52) U.S. Cl. .................... 264/259; 264/132; 264/260
(58) Field of Classification Search .................. 264/132, 264/259, 260, 261
See application file for complete search history.

(56) References Cited

U.S. PATENT DOCUMENTS

| | | | |
|---|---|---|---|
| 3,465,384 A * | 9/1969 | Ferguson et al. | 425/145 |
| 4,217,163 A * | 8/1980 | Utzmann et al. | 156/361 |
| 5,082,435 A * | 1/1992 | Kuramitsu et al. | 425/117 |

FOREIGN PATENT DOCUMENTS

| | | |
|---|---|---|
| GB | 2 350 583 | 12/2000 |
| JP | 3-231821 | 10/1991 |
| JP | 2000-185330 | 7/2000 |
| JP | 2000-254938 | 9/2000 |
| JP | 2003-53779 | 2/2003 |
| JP | 2006-56106 | 3/2006 |

OTHER PUBLICATIONS

International Search Report issued Nov. 4, 2008 in corresponding International Application No. PCT/JP2008/068074.
Office Action issued Dec. 8, 2009 in Japanese Application No. 2008-258781 (with English translation).
Notice of Allowance issued Mar. 2, 2010 in Japanese Application No. 2008-258781 (with English translation).

\* cited by examiner

*Primary Examiner* — Jill L Heitbrink
(74) *Attorney, Agent, or Firm* — Wenderoth, Lind & Ponack, L.L.P.

(57) ABSTRACT

In the simultaneous molding and decorating method for forming an image onto the surface of a resin molding simultaneously with resin molding by holding a decoration sheet on which the image is rotary printed in a die, such a decoration sheet as having a predetermined pattern for every revolution of the cylinder of a printing machine wherein the image is formed in the longitudinal direction at a constant interval is used. By holding the decoration sheet longer than one revolution but shorter than two revolutions of that in the die and performing resin molding, the image is formed onto the surface of a long molding exceeding the outer circumference of the cylinder.

3 Claims, 5 Drawing Sheets

SIMULTANEOUS INJECTION-MOLDING AND DECORATING METHOD

TECHNICAL FIELD

The present invention relates to a simultaneous injection-molding and decorating method which enables applying decoration to an long molded product, such as a decoration panel for a large-sized television, simultaneously with resin molding.

BACKGROUND ART

Conventionally, with respect to a method for decorating surfaces of molded products, there has been known a method which inserts, into a metal mold, a decorating sheet having a base sheet provided thereon with designs and the like, then closes the metal mold, then injects a molten resin into the cavity of the metal mold and, simultaneously therewith, adheres designs on the decorating sheet to a surface of the resin molded product for fabricating a decorated molded product (refer to JP-A No. 3-231821, for example).

FIG. 6 illustrates the structure of a metal mold for use in fabricating such a product through simultaneous injection-molding and decorating.

In the same figure, the metal mold includes a movable mold 50 and a stationary mold 51, and the movable mold 50 is provided with a cavity 52 for providing a molded product.

On the other hand, the stationary mold 51 is provided with a core 53 at a place corresponding to the aforementioned cavity 52 and, further, is provided with an injection gate 54 for injecting a molten resin.

A decorating sheet 55 is set between the movable mold 50 and the stationary mold 51. The decorating sheet 55 is generally formed from a laminated body constituted by a base sheet 55a, a mold release layer 55b, a peel layer 55c, a decorating layer 55d and a bonding layer 55e. The decorating sheet 55 is set such that the base sheet 55a faces the cavity 52.

The movable mold 50 and the stationary mold 51 are closed and, then, a molten resin 56 is injected through the injection gate 54 into the cavity to which the decorating sheet 55 adheres tightly. After the molten resin 56 is cured, the metal mold is opened, and the base sheet 55a is separated together with the mold release layer 55b from the molded product, thereby resulting in a decorated molded product.

Further, in a case where decorated molded products are successively formed, a feeding roll for feeding the decorating sheet 55 into the metal mold is placed above the metal mold, for example, and a wind-up roll for winding up the base sheet after designs are transferred therefrom is placed below the metal mold.

However, with the aforementioned simultaneous injection-molding and decorating method, when a gravure printing machine for forming a design layer has a cylinder outer circumference of 940 mm, for example, the maximum value of the size of decoration is limited to 940 mm, which has made it impossible to perform simultaneous injection-molding and decorating for decoration panels for large-sized televisions having lateral widths larger than 940 mm. As described above, the aforementioned conventional simultaneous injection-molding and decorating method imposes a constraint on the sizes of molded products which can be decorated.

As a matter of course, it is possible to apply simultaneous injection-molding and decorating to long molded objects, by increasing the diameter of the cylinder. However, it is not practical to introduce new gravure printing equipment for coping therewith.

DISCLOSURE OF THE INVENTION

The present invention was made in consideration of the problems in conventional simultaneous injection-molding and decorating methods as described above and aims at providing a simultaneous injection-molding and decorating method capable of applying decoration, simultaneously with resin molding, to long objects to be decorated having lengths larger than the outer circumference of the cylinder of a printing machine, using existing equipment.

In order to achieve the above-mentioned object, the present invention is provided with following steps.

A simultaneous injection-molding and decorating method for inserting, into a metal mold, a decorating sheet on which a design is rotary printed and forming the design onto a surface of a resin molded product simultaneously with resin molding, comprising the steps of:

preparing the decorating sheet having a predetermined designs for every revolution of a cylinder of a printing machine, the designs being formed in a longitudinal direction at a constant interval;

inserting the decorating sheet longer than one revolution of the cylinder but shorter than two revolutions thereof into the metal mold;

performing resin molding;

thereby forming the designs onto the surface of a long molded product having a length exceeding the outer circumference of the cylinder.

In the present invention, every other design in the designs formed on the decorating sheet at a constant interval can be positioned with respect to the center of a cavity in the metal mold for resin molding.

In the present invention, every other feeding direction mark in the feeding direction marks formed on the decorating sheet such that each feeding direction mark is formed per one molded product, can be detected for positioning the designs, when the decorating sheet is fed into the metal mold.

The simultaneous injection-molding and decorating method according to the present invention has the advantage that it is possible to apply decoration, simultaneously with resin molding, to long objects to be decorated with lengths larger than the outer circumference of the cylinder of a printing machine, using a decorating sheet printed by an existing gravure printing machine, for example.

BEST MODE FOR CARRYING OUT THE INVENTION

Figure 1:
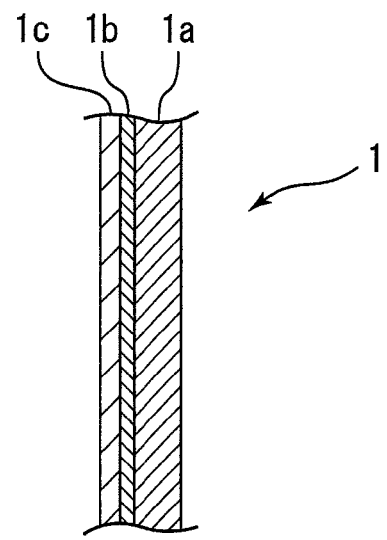
FIG. 1 is a cross-sectional view of a decorating sheet for use in a simultaneous injection-molding and decorating method according to the present invention.

Hereinafter, the present invention will be described in detail, based on an embodiment illustrated in the drawings.

At first, there will be described a decorating sheet for use in a simultaneous injection-molding and decorating method according to the present invention.

1. Decorating Sheet

FIG. 1 illustrates an insert sheet 1 as an embodiment of a decorating sheet. The insert sheet 1 is basically constituted by laminating a design layer 1b and a bonding layer 1c on a base sheet 1a. The insert sheet 1 is adapted such that the design layer 1b is adhered to a molded resin with the bonding layer 1c interposed therebetween and, thereafter, the base sheet 1a is left thereon as a protective layer without being separated therefrom.

Figure 2:
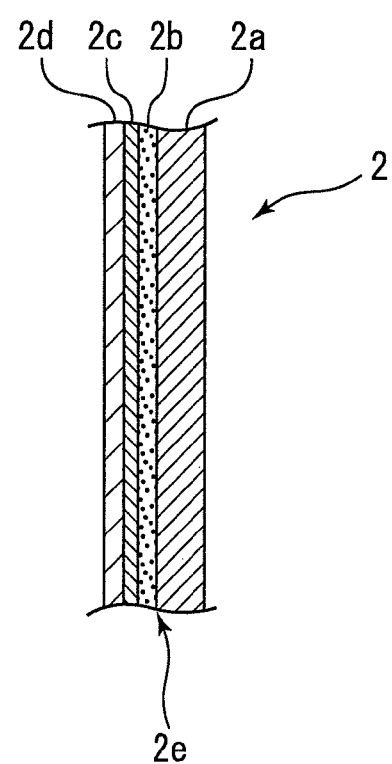
FIG. 2 is a cross-sectional view of another decorating sheet for use in the simultaneous injection-molding and decorating method according to the present invention.

FIG. 2 illustrates a transfer sheet 2 as a second embodiment of the decorating sheet. The transfer sheet 2 is basically constituted by laminating a peel layer 2b, a design layer 2c and a bonding layer 2d on a base sheet 2a. The transfer sheet 2 is adapted such that the design layer 2c is adhered to a molded resin with the bonding layer 2d interposed therebetween and, thereafter, the base sheet 2a is separated and removed from a boundary surface 2e between the base sheet 2 and the peel layer 2b during or after opening the metal mold.

1-1. The Base Sheet

As the materials of the base sheets 1a and 2a, it is preferable to employ PET (polyethylene terephthalate) having excellent heat resistance, but they are not limited thereto, and it is also possible to employ a single-layer film made of one selected from a polycarbonate resin, a polyamide resin, a polyimide resin, a polyester resin, an acrylic resin, an olefin resin, an urethane resin, an acrylonitrile-butadiene-styrene resin, a vinyl chloride resin and the like or a laminated-layer film or a copolymer film which is made of two types of resins selected from the aforementioned resins.

The thicknesses of the base sheets 1a and 2a can be in the range of 5 to 500 micrometers, preferably in the range of 25 to 75 micrometers in consideration of facilitation of handling, and preferably in the range of 38 to 50 micrometers in consideration of improvement of the stability of molding.

1-2. The Peel Layer

The peel layer 2b is the layer positioned at the outermost side after the transfer of designs and the separation of the base sheet 2a and is adapted to function as a protective layer for the designs. The material of the peel layer 2b can be an acrylic-based resin, a nitrocellulose-based resin, a polyurethane-based resin, a chlorinated-rubber-based resin, a vinyl chloride-vinyl acetate copolymer based resin, a polyamide-based resin, a polyester-based resin, an epoxy-based resin, a polycarbonate-based resin, an olefin-based resin, an acrylonitrile-butadiene-styrene resin and the like.

In a case where the peel layer 2b is required to have high hardness, it is possible to employ an ionization radiation curing resin, such as a UV curing resin. Further, such an ionization radiation curing resin can be either employed either solo or in combination with another resin. Preferably, the peel layer 2b has a thickness in the range of 0.5 to 50 micrometers.

1-3. The Design Layer

The design layers 1b and 2c are for forming characters, symbols, patterns, painted patterns and the like and can be formed by printing such as well-known gravure printing, using a mixture of a resin binder and a pigment (or a dyestuff) or a mixture of a resin binder and a metal pigment or inorganic pigment with concealing and shielding characteristics, and the like.

Gravure printing is printing by holding an ink within fine concave portions in a plate and transferring the ink to the base sheet 1a or the peel layer 2b with a pressure from an impression cylinder, and the ink for use therein is basically solvent-based. Thus, gravure printing offers the advantage of provision of excellent adherability even to a plastic film with poor wettability, such as the peel layer 2b.

Further, a surface of the plastic film does not absorb the ink and also is extremely flattened, which enables formation of fine designs by gravure printing using an ink with excellent compatibility with the peel layer 2b.

Further, as a method for forming the design layer 2c on the peel layer 2b, it is possible to employ offset printing, for example, as well as gravure printing as described above.

Also, it is possible to form the design layers 1b and 2c from metal film layers made of, for example, aluminum, chromium, copper, nickel, indium, tin, silicon oxide and the like, through vacuum deposition, plating and other methods, as well as from a combination of a resin binder and a pigment as described above. Further, the thicknesses of the design layers 1b and 2c are preferably set to within the range of 0.5 micrometer to 50 micrometers in order to provide a sufficient design characteristic, and are preferably set to within the range of 50 angstroms to 1200 angstroms in the case of forming the design layers 1b and 2c from metal film layers as described above.

1-4. The Bonding Layer

The bonding layers 1c and 2d are for adhering the design layers 1b and 2c to molded product surfaces, and are made of a resin with heat sensitivity or pressure sensitivity and with excellent compatibility with the material of the molded resin.

For example, it is possible to employ an acrylic-based resin, a nitrocellulose-based resin, a polyurethane-based resin, a chlorinated-rubber-based resin, a polyamide-based resin, a polyester-based resin, an epoxy-based resin, a polycarbonate-based resin, an olefin-based resin, an acrylonitrile-butadiene-styrene resin and the like. Further, preferably, the thicknesses of the bonding layers 1c and 2d are in the range of 0.5 to 50 micrometers.

Next, there will be described the structure of a simultaneous injection-molding and decorating apparatus for use in the simultaneous injection-molding and decorating method according to the present invention.

2. The Simultaneous Injection-Molding and Decorating Apparatus

Figure 3:
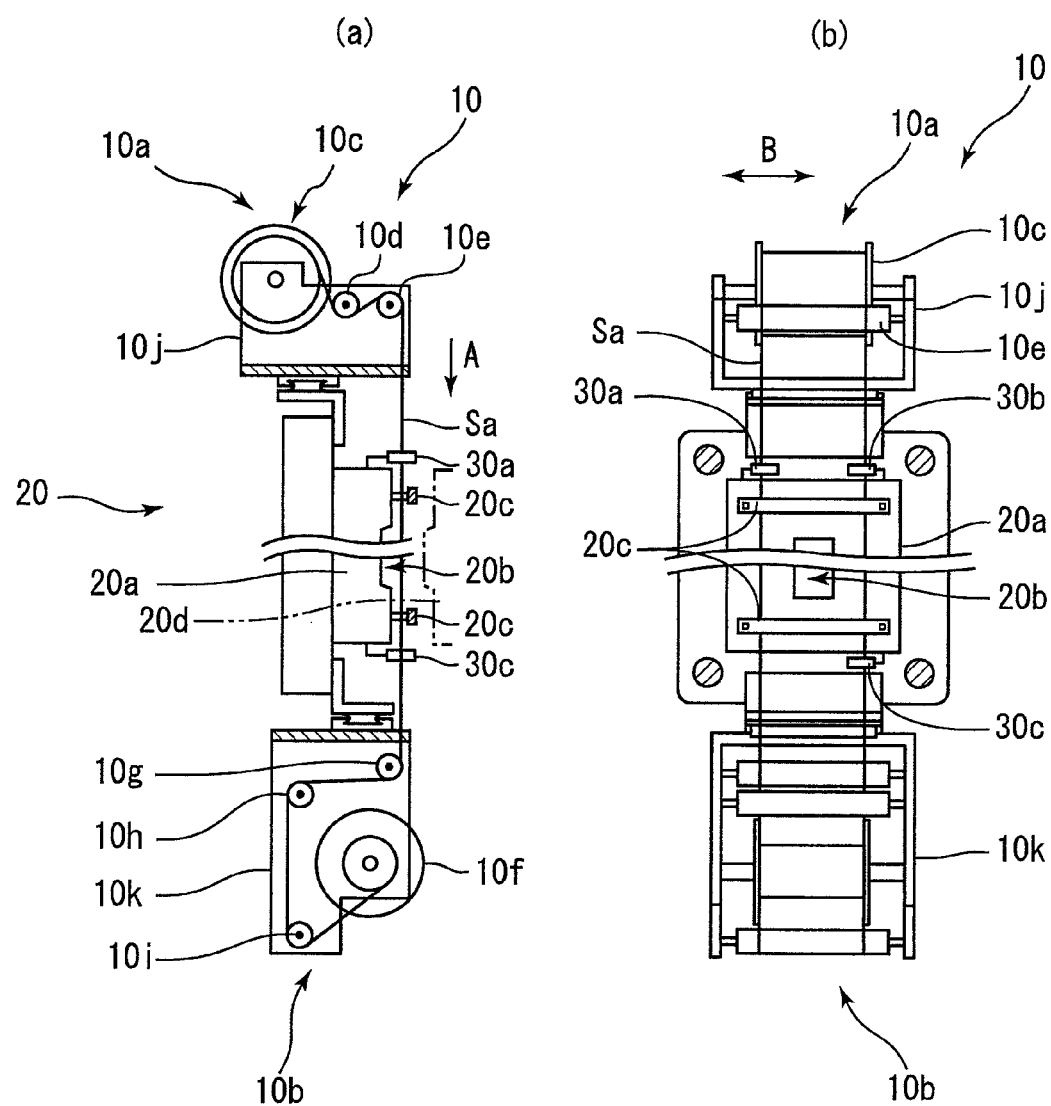
FIG. 3(a) is a side view illustrating the structure of a simultaneous injection-molding and decorating apparatus.
FIG. 3(b) is a front view of the same.

As illustrated in FIG. 3, the simultaneous injection-molding and decorating apparatus includes a decorating-sheet supply device 10 and a metal mold device 20, wherein FIG. 3(a) and FIG. 3(b) are a side view and a front view, respectively.

The decorating-sheet supply device 10 is for intermittently supplying a decorating sheet Sa to the inside of a molding die 20a and includes a decorating-sheet supply portion 10a and a decorating-sheet wind-up portion 10b.

The decorating-sheet supply portion 10a is adapted to wind the decorating sheet Sa with a larger length around a roll 10c and to wind off the decorating sheet Sa at its one end through guide rollers 10d and 10e.

The decorating sheet Sa supplied from the decorating-sheet supply portion 10a is wound up by the decorating-sheet wind-up portion 10b and, thus, is descended in the direction of an arrow A, which directs designs intermittently formed on the decorating sheet Sa to a cavity 20b in the molding die 20a.

Further, 10f in the decorating-sheet wind-up portion 10b designates a wind-up roll, and 10g, 10h and 10i designate guide rollers.

Figure 4:
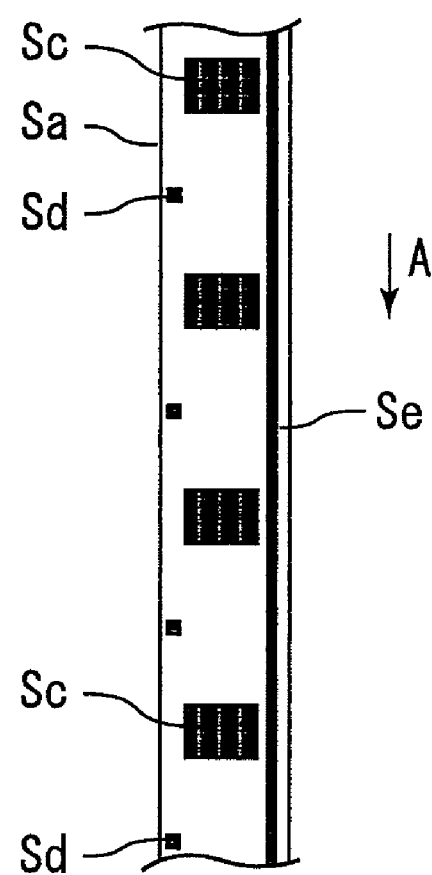
FIG. 4 is an explanation view illustrating the structure of a decorating sheet.

FIG. 4 illustrates a portion of the decorating sheet Sa from the portion in front thereof, wherein plural designs Sc and plural feeding direction marks Sd are formed at a constant interval in a longitudinal direction and, further, a widthwise-direction mark Se is formed in a line shape along the longitudinal direction of the decorating sheet Sa.

The feeding direction marks Sd are detected by a first sensor 30a (see FIGS. 3(a) and 3(b)) provided on the path of movement of the decorating sheet Sa, while the widthwise-direction mark Se is detected by a second sensor 30b and a third sensor 30c.

More specifically, when the decorating sheet Sa travels in the direction of an arrow A, if the first sensor 30a detects the lower end of a feeding direction mark Sd, the speed of feeding of the decorating sheet Sa is decreased and, if the same first sensor 30a detects the upper end of a feeding direction mark Sd, the decorating sheet Sa is moved (descended) by a predetermined distance and, thereafter, is stopped.

Further, the feeding of the decorating sheet Sa is controlled by a feeding operation control portion which is not illustrated.

The feeding operation control portion controls respective driving portions in the decorating-sheet supply device 10 based on positional information detected by the first sensor 30a.

Further, the widthwise-direction mark Se is detected by the second sensor 30b and the third sensor 30c, thereby the displacement of the decorating sheet Sa in the widthwise direction is adjusted.

The displacement of the widthwise direction can be performed, by sliding one or both of an upper frame 10j and a lower frame 10k in the direction of an arrow B. The two sensors 30b and 30c are placed, in order to adjust the inclination of the decorating sheet Sa.

The decorating sheet Sa which has been moved to a position at which the decorating sheet Sa faces the cavity 20b as described above is pressed against the molding die 20a with film clamps 20c and 20c. Thus, the designs Sc on the decorating sheet Sa are accurately positioned with respect to the cavity 20b.

In the figure, 20d designates a movable mold placed opposite to the molding die 20a.

3. Method for Fabricating a Product through Simultaneous Injection-Molding and Decorating Next, with reference to FIGS. 3 to 5, there will be described a method for fabricating a product through simultaneous injection-molding and decorating.

Figure 5:
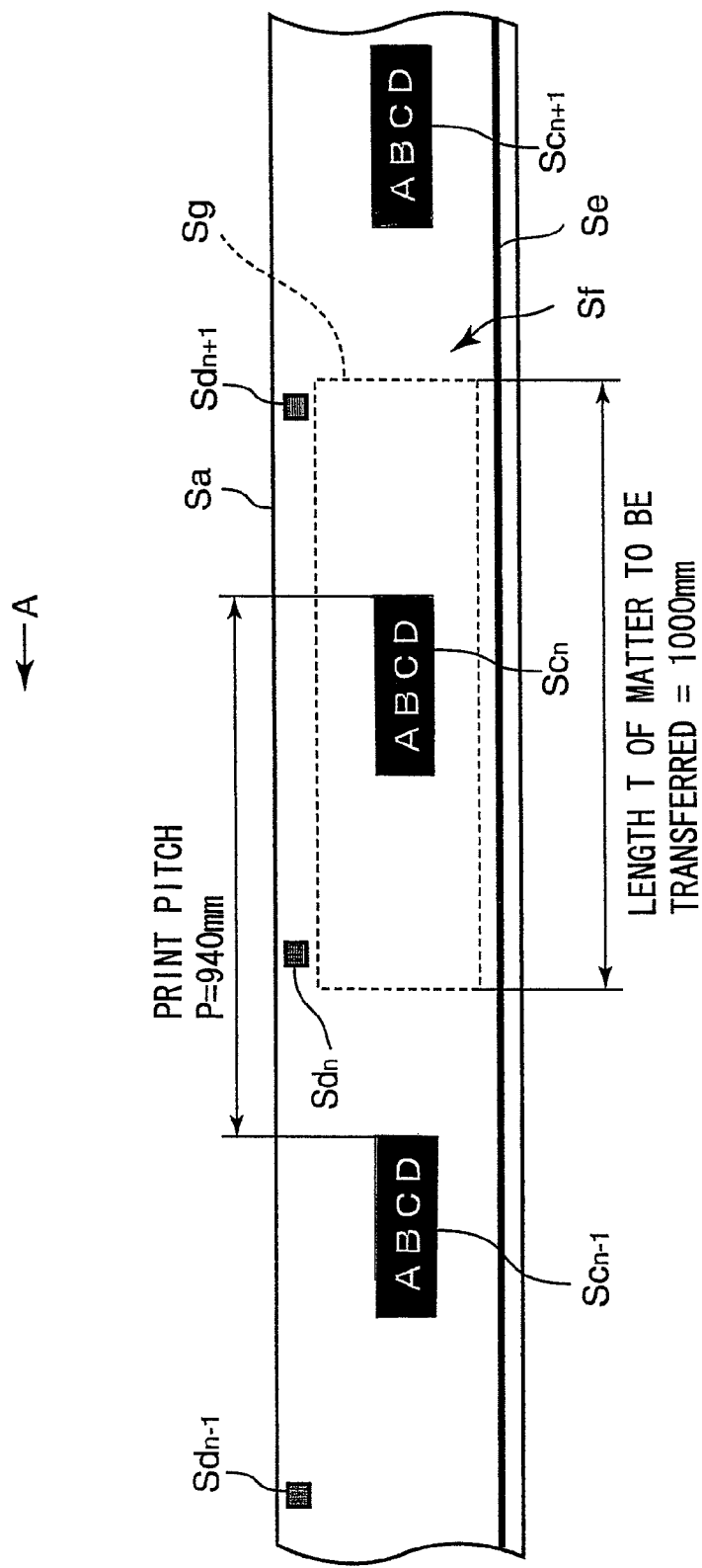
FIG. 5 is a major-part enlarged view of the decorating sheet illustrated in FIG. 4.
Figure 6:
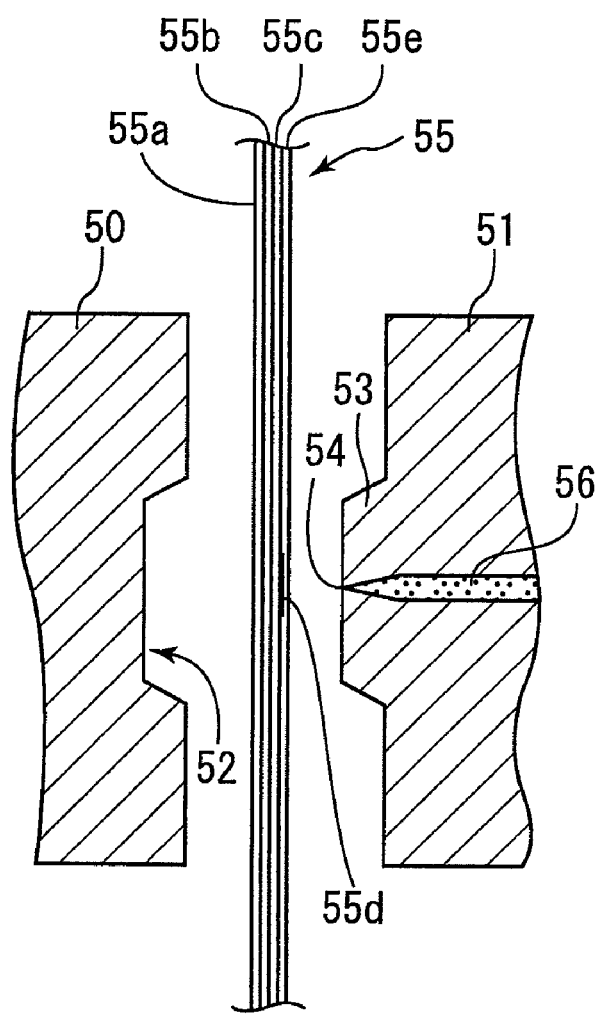
FIG. 6 is a side cross-sectional view illustrating the structure of a conventional simultaneous injection-molding and decorating apparatus.

FIG. 5 enlarges the decorating sheet Sa illustrated in FIG. 4, wherein there are formed logos (predetermined designs each of which exists in correspondence with one revolution of the cylinder) Sc at a constant interval, namely with a printing pitch P=940 mm (or less). Further, in the following description, the logo to be used for decoration in the logos Sc, will be referred to as $Sc_n$, while the logo downstream from the logos $Sc_n$ in the feeding direction will be referred to as $Sc_{n-}$, and the logo upstream therefrom in the feeding direction will be referred to as $Sc_{n+1}$.

The logos Sc have been printed using a gravure printing machine having a cylinder outer circumference of 940 mm.

In the figure, Sg designates the transferring range for transferring designs to a long molded product according to the simultaneous injection-molding and decorating method, and the transferring range has a length over a length corresponding to more than one revolution of the cylinder but less than two revolutions thereof.

Further, there are printed, at an end portion of the decorating sheet Sa in the widthwise direction, feeding direction marks Sd each being between adjacent logos Sc. In the following description, the feeding direction mark between the logo $Sc_n$ and the logo $Sc_{n-1}$ in the feeding direction marks Sd will be referred to as $Sd_n$, the feeding direction mark between the logo $Sc_n$ and the logo $Sc_{+1}$ in the feeding direction marks Sd will be referred to as $Sd_{n+1}$, and the feeding direction mark downstream from the logo $Sc_{n-1}$ in the feeding direction will be referred to as $Sd_{n-1}$.

These feeding direction marks Sd are detected by the first sensor 30a. Originally, each of these feeding direction marks Sd is formed per one molded product in order to position each logo $Sc_{n-1}$, $Sc_n$ and $Sc_{n+1}$ with respect to the cavity 20b.

Assuming that a long object to be subjected to transfer through a simultaneous injection-molding and decorating method has a length T of 1000 mm, a logo Sc is positioned with reference to the detected feeding direction mark Sd each time the feeding direction mark Sd is detected according to conventional simultaneous injection-molding and decorating methods, which causes a shortage of the longitudinal length of the decorating sheet Sa by 1000−940=60 mm, even if an attempt is made to decorate the long object to be subjected to transfer.

Accordingly, simultaneous injection-molding and decorating methods have not been performed on long objects to be subjected to transfer having lengths larger than the outer circumferences of cylinders in gravure printing machines.

On the contrary, with the simultaneous injection-molding and decorating method according to the present invention, the first sensor 30a detects every other feeding direction marks Sd in the feeding direction marks Sd arranged at even intervals on the decorating sheet Sa, which enables performing simultaneous injection-molding and decorating on long objects to be subjected to transfer.

More specifically, assuming that the decorating sheet Sa is fed in the direction of an arrow A, the feeding direction mark for positioning the center logo $Sc_n$ is referred to as $Sd_n$, the feeding direction mark for positioning the logo $Sc_{n-}$ downstream from the center logo $Sc_n$ in the feeding direction is referred to as $Sc_{n-1}$, and the feeding direction mark for positioning the logo $Sc_{n+1}$ upstream therefrom in the feeding direction is referred to as $Sd_{n+1}$ in a case of using the center logo $Sc_n$ for decoration, the logo $Sc_{n-1}$ and the logo $Sc_{n+1}$ at the opposite sides with respect thereto in the forward and rearward directions are not used for the decoration.

To describe this with respect to operations for feeding the decorating sheet Sa, in a case of transferring the center logo $Sc_n$, the first sensor 30a is prevented from detecting the feeding direction mark $Sd_{n-1}$ for the logo $Sc_{n-1}$ downstream therefrom in the feeding direction and the feeding direction mark $Sd_{n+1}$ for the logo $Sc_{n+1}$ upstream therefrom in the feeding direction.

More specifically, if the decorating sheet Sa is fed into the metal mold, and the first sensor 30a detects the feeding mark $Sd_n$ for positioning the center logo $Sc_n$, the first sensor 30a activates a timer and, during the time interval during which the timer measures time, the settings of the feeding operation are changed, such that the next feeding direction mark $Sd_{n+1}$ upstream therefrom in the feeding direction will not be detected.

The time interval during which the timer measures time is set to such a time as to allow the first sensor 30a to pass a singe feeding direction mark Sd therethrough without detecting the single feeding direction mark Sd. Accordingly, the feeding direction mark $Sd_{n-1}$ downstream, in the feeding direction, from the feeding direction mark $Sd_n$ for positioning the center logo $Sc_n$ is similarly prevented from being detected thereby.

Further, although there has been described a case where the center logo $Sc_n$ is positioned based on the feeding direction mark $Sd_n$, it is also possible to position the center logo $Sc_n$ based on the feeding direction mark $Sd_{n+1}$.

By changing the settings of the operations for feeding the decorating sheet Sa as described above, it is possible to apply decoration to a long object to be subjected to transfer which has a length larger than the outer circumference of the cylinder of a gravure printing machine, using an existing simultaneous injection-molding and decorating apparatus. This enables applying transfer to a long object to be subjected to transfer having a length of 1000 mm, for example.

Also, the aforementioned feeding direction marks Sd can be formed at the center of the decorating sheet Sa in the widthwise direction, as well as at an end portion of the decorating sheet Sa in the widthwise direction, provided that they do not fall within the transferring range Sg.

Further, when a hair line pattern Sf is formed uniformly in the sheet longitudinal direction around the logos Sc, for example, conventional decorating methods induce a shortage of the hair line pattern Sf at the opposite ends in the direction of sheet feeding, in the transferring range. However, with the decorating method according to the present invention, for coping with such a shortage, portions of the hair line pattern Sf which are formed around the logo $Sc_{n-1}$ and the logo $Sc_{n+1}$ adjacent to a center logo $Sc_n$ downstream and upstream therefrom in the feeding direction can be introduced to the portions which induce a shortage of the hair line pattern for the center logo $Sc_n$. This enables transferring the continuous pattern to a long object to be subjected to transfer.

Further, the pattern around the logos Sc can be a waveform pattern, a lattice-shaped pattern, a geometric pattern and the like, as well as the aforementioned hair line pattern Sf, provided that the pattern around the logos Sc is repeated and continuous in the longitudinal direction of the decorating sheet Sa.

Further, although the present invention has been sufficiently described with respect to preferred embodiments with reference to the accompanying drawings, those skilled in the art can implement the present invention by adding various changes and modifications thereto. It should be understood that such changes and modifications fall within the technical scope of the invention, without departing from the scope of the claims of the present invention.

INDUSTRIAL APPLICABILITY

The simultaneous injection-molding and decorating method according to the present invention can be suitably applied to objects to be molded with larger lengths which are required to be subjected to decoration, such as panels which form the frames of large-sized televisions.

The invention claimed is:

1. A simultaneous injection-molding and decorating method for inserting, into a metal mold, a decorating sheet on which a design is rotary printed and forming the design onto a surface of a resin molded product simultaneously with resin molding, comprising the steps of:

preparing the decorating sheet having predetermined designs for every revolution of a cylinder of a printing machine, the designs being formed in a longitudinal direction at a constant interval;

inserting the decorating sheet longer than one revolution of the cylinder but shorter than two revolutions thereof into the metal mold;

performing resin molding;

thereby forming the designs onto the surface of a long molded product having a length exceeding the outer circumference of the cylinder.

2. The simultaneous injection-molding and decorating method according to claim 1, wherein every other design in the designs formed on the decorating sheet at a constant interval is positioned with respect to the center of a cavity in the metal mold for resin molding.

3. The simultaneous injection-molding and decorating method according to claim 2, wherein every other feeding direction mark in the feeding direction marks formed on the decorating sheet such that each feeding direction mark is formed per one molded product, is detected for positioning the designs, when the decorating sheet is fed into the metal mold.

* * * * *